US007616579B2

(12) United States Patent
Slattery et al.

(10) Patent No.: US 7,616,579 B2
(45) Date of Patent: Nov. 10, 2009

(54) VOICE OVER IP ANALYSIS SYSTEM AND METHOD

(75) Inventors: Terrance C. Slattery, Annapolis, MD (US); Frank M. Pittelli, Edgewater, MD (US)

(73) Assignee: Netcordia, Inc., Annapolis, MD (US)

( * ) Notice: Subject to any disclaimer, the term of this patent is extended or adjusted under 35 U.S.C. 154(b) by 633 days.

(21) Appl. No.: 11/185,881

(22) Filed: Jul. 21, 2005

(65) Prior Publication Data

US 2007/0019559 A1   Jan. 25, 2007

(51) Int. Cl.
H04L 12/26 (2006.01)
(52) U.S. Cl. ........................................ 370/241; 370/248
(58) Field of Classification Search .................. 370/241, 370/242, 248–252
See application file for complete search history.

(56) References Cited

U.S. PATENT DOCUMENTS

| 6,598,183 | B1 | 7/2003 | Grieco et al. |
| 6,738,353 | B2 | 5/2004 | Chong |
| 6,816,464 | B1 * | 11/2004 | Scott et al. ................... 370/252 |
| 7,120,122 | B1 * | 10/2006 | Starr et al. ................... 370/250 |
| 2002/0145979 | A1 | 10/2002 | Baj |
| 2003/0086425 | A1 * | 5/2003 | Bearden et al. ............. 370/392 |
| 2003/0202462 | A1 | 10/2003 | Smith et al. |
| 2005/0152339 | A1 | 7/2005 | Scott et al. |
| 2006/0156086 | A1 * | 7/2006 | Flynn et al. ................. 714/712 |

* cited by examiner

*Primary Examiner*—Kwang B Yao
*Assistant Examiner*—Andrew Lai
(74) *Attorney, Agent, or Firm*—Foley & Lardner LLP

(57) ABSTRACT

A path diagnosis method and system for a VoIP network includes obtaining information on VoIP calls from the VoIP network using either Call Data Records (CDRs) or active testing, or both. A VoIP call that has a problem is determined between a source and a destination device on the VoIP network, based on the obtained information. Likely call paths between the source and destination devices on the VoIP network are determined. The VoIP network is queried to obtain network data with respect to all devices that exist between the source and destination devices along the likely call paths. A path diagnostics chart is displayed that shows the devices that exist between the source and destination devices along the likely call paths, along with any call issues that exist for each of the devices.

27 Claims, 8 Drawing Sheets

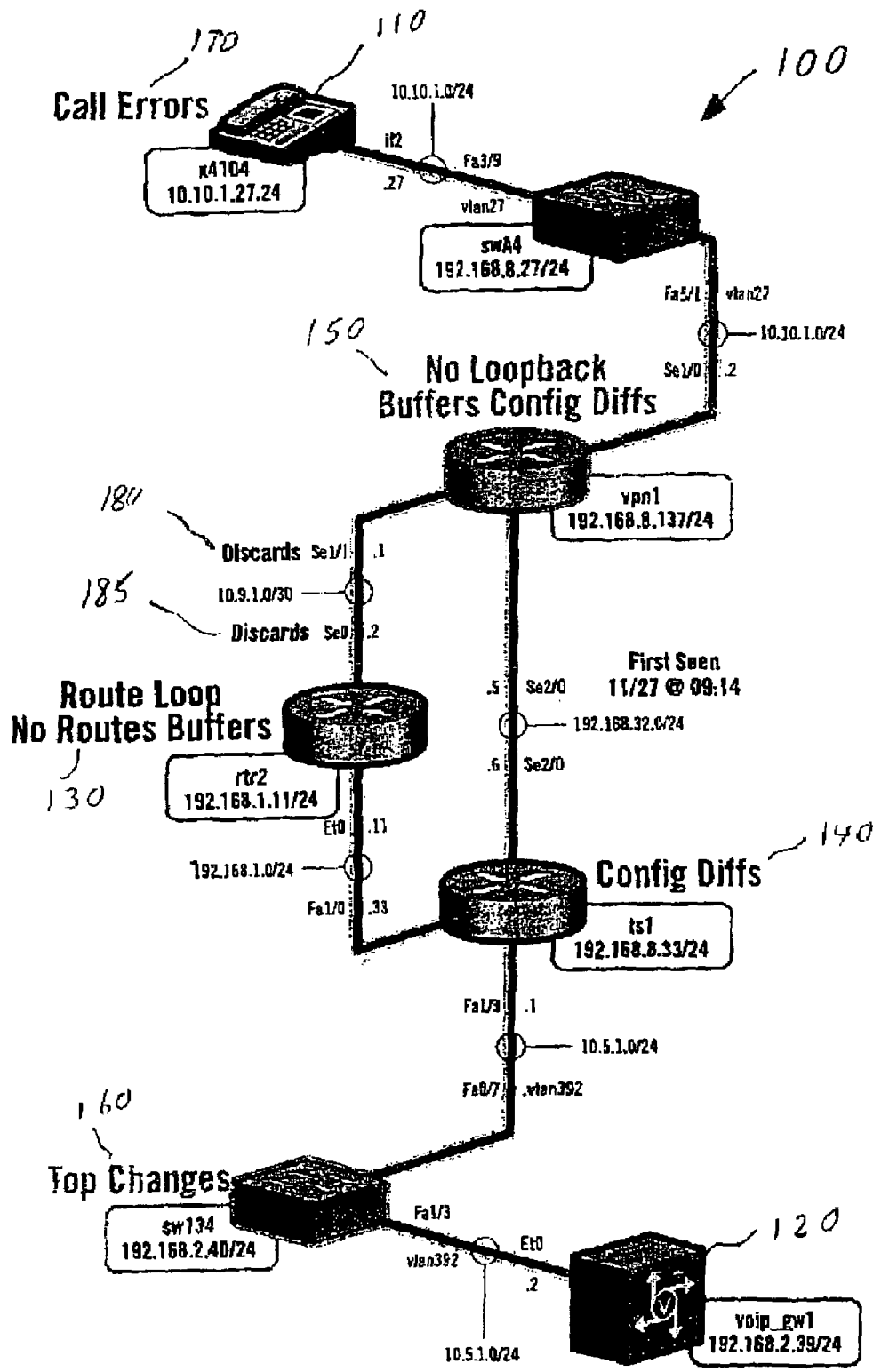

Figure 2

Path Diagnostic Settings

This form is used to specify the source and target IP Addresses (or hostname) for the path to be diagnosed. The Gateway value is used if the next hop from a given device along the path cannot be determined using the database information.

Source: 10.1.8.3 (required)
Target: 10.17.8.4 (required)
Gateway: 0.0.0.0 (required)

This setting determines if the diagnostic chart will show just routing information (Layer 3 Only) or both routing and switching information (Layer 2 and 3)

Display Depth: ⦿ Layer 3 Only  ◯ Layer 2 and 3

The following settings can be used to view all of the possible routes that existed during a given time period.

Timestamp: 2005-01-05

Period: ⦿ Daily  ◯ Weekly  ◯ Monthly
        ◯ 7-Day  ◯ 30-Day

OK

Host List

This is a list of IP addresses for all known network devices. Select one of these entries to use it as the source or target address in the form above.

Addr: ⦿ Source  ◯ Target

Hosts:
- 10.1.8.3 (tr3-c-rsm-2)
- 10.1.8.4 (tr3-c-6509-1)
- 10.1.8.5 (tr3-c-6509-2)
- 10.1.8.7 (tr3-VoIP-2950-1)
- 10.1.8.217 (dist-od-4503-1)
- 10.1.8.253 (rmt-sites-2950-1)
- 10.1.114.4 (Gateway-3725-1)
- 10.1.181.4 (net-mgmt-2950-1)
- 10.1.254.246 (rmt-site-7204)
- 10.1.254.250 (3725-RAS)
- 10.4.8.2 (b3-dist-rsm-1)
- 10.4.8.3 (b3-dist-rsm-2)
- 10.4.8.4 (b3-dist-6513)
- 10.4.8.6 (w1-4506-1)
- 10.4.60.253 (non-3rdFlr-conf)
- 10.17.8.2 (B2-dist-rsm-1)
- 10.17.8.4 (B2-dist-6509-1)
- 10.17.8.6 (B2-bn-3548-1)
- 10.17.8.10 (B2-1n-3548-1)
- 10.17.8.11 (B2-1n-3548-2)
- 10.17.8.20 (B2-2n-3548-1)
- 10.17.8.21 (B2-2n-3548-2)

Figure 3

Path Diagnosis 2005/01/05

[Settings] [Cancel]   Period: Daily

Source: 10.1.8.3 / tr3-c-rsm-2     Gateway: 0.0.0.0 / undefined
Target: 10.17.8.4 / B2-dist-6509-1  Depth: Layer 3 Only PDF TEXT Processing Completed

```
Source:
Device 30, tr3-c-rsm-2, Router, 10.1.8.3
Intf 10, 10.1.8.3, 00:0A:42:80:A7:FC
Subnet 10.1.8.0/255.255.255.0

Target:
Device 88, B2-dist-6509-1, Switch, 10.17.8.4
Intf 1, 10.17.8.4, 00:D0:77:89:88:FF
Subnet 10.17.8.0/255.255.255.0

Getting next hops from tr3-c-rsm-2 towards B2-dist-6509-1
+++ Looking for local hop in 10.1.8.0/24
+++ > Devices are not in the same subnet
+++ Looking for matching route(s) in tr3-c-rsm-2 route table
+++ > Using route 10.17.8.0/24, 10.1.254.78, indirect, 3072, V1873
+++ > Looking for B2-dist-rsm-1 peer interface for tr3-c-rsm-2/10.1.254.77
+++ > Searching B2-dist-rsm-1 subnets for 10.1.254.77
+++ > Found peer interface V1873
+++ Found 1 hop(s): B2-dist-rsm-1/28

Getting next hops from B2-dist-rsm-1 towards B2-dist-6509-1
+++ Looking for local hop in 10.1.254.76/30
+++ > Devices are not in the same subnet
+++ Looking for matching route(s) in B2-dist-rsm-1 route table
+++ > Using route 10.17.8.0/24, 10.17.8.2, direct, 0, V130
+++ > Looking for B2-dist-6509-1 peer interface for B2-dist-rsm-1/10.17.8.1
+++ > Searching B2-dist-6509-1 subnets for 10.17.8.1
+++ > Found peer interface sc0
+++ Found 1 hop(s): B2-dist-6509-1/1

Device and Interface Issues
---------------------------
+++ tr3-c-rsm-2: Cfg Policy, Cfg Diffs, No Loopback, No Route, Route Loop?, Buffers
+++ tr3-c-rsm-2[V1873]: OK
+++ B2-dist-rsm-1[V1873]: OK
+++ B2-dist-rsm-1: Cfg Not Saved, No Loopback, Buffers
+++ B2-dist-rsm-1[V130]: OK
+++ B2-dist-6509-1[sc0]: Discards
+++ B2-dist-6509-1: OK
```

Getting next hops from tr3-c-rsm-2 towards B2-dist-6509-1
+++ Looking for local hop in 10.1.8.0/24
+++ > Devices are not in the same subnet
+++ Looking for matching route(s) in tr3-c-rsm-2 route table
+++ > Using route 10.17.8.0/24, 10.1.254.78, indirect, 3072, V1873
+++ > Looking for B2-dist-rsm-1 peer interface for tr3-c-rsm-2/10.1.254.77
+++ > Searching B2-dist-rsm-1 subnets for 10.1.254.77
+++ > Found peer interface V1873
+++ Found 1 hop(s): B2-dist-rsm-1/28

Device and Interface Issues
----------------------------
+++ tr3-c-rsm-2: Cfg Policy, Cfg Diffs, No Loopback, No Route, Route Loop?, Buffers
+++ tr3-c-rsm-2[V1873]: OK
+++ B2-dist-rsm-1[V1873]: OK
+++ B2-dist-rsm-1: Cfg Not Saved, No Loopback, Buffers
+++ B2-dist-rsm-1[V130]: OK
+++ B2-dist-6509-1[sc0]: Discards
+++ B2-dist-6509-1: OK

Figure 6

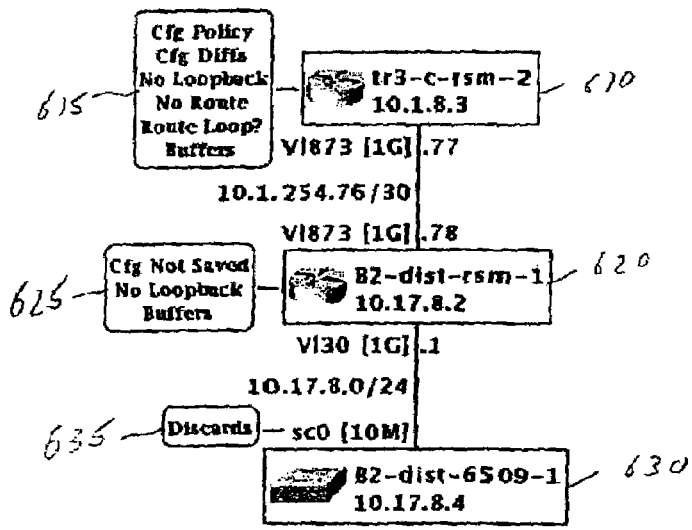

VOICE OVER IP ANALYSIS SYSTEM AND METHOD

FIELD OF THE INVENTION

The invention relates to voice over IP (VoIP) analysis. More specifically, the invention relates to the obtaining of path diagnostics information to allow operators to diagnose and resolve problems in a VoIP system.

BACKGROUND OF THE INVENTION

Voice over IP (VoIP) encodes speech as a series of small packets that are sent at regular intervals over a network. The H.323 G.723 codec (coder/decoder) at a sending telephone creates packets of 65 to 69 bytes, and sends them out over a network (e.g., the Internet) every 30 to 120 milliseconds. Other codecs use similar packet sizes and intervals. Packets must arrive at the receiving telephone on a regular basis and with low overall delay, or the received audio suffers.

There are three primary constraints on the series of packets carrying a voice call in order to recreate an acceptable audio stream at the receiving telephone: delay, jitter, and lost packets. Delay corresponds to the time delay from the sending telephone to the receiving telephone. 150 milliseconds or less is typically deemed to be an acceptable delay. Jitter corresponds to the variation in the delay of arriving packets. High jitter sounds like echo, which is undesirable. 30 milliseconds or less jitter is typically deemed to be acceptable. Lost packets correspond to the percentage of packets that are lost in transit. A lost packet results in silence played for its time slot at the receiving telephone. Less than 1% packet is typically deemed to be acceptable.

A stable and predictive network is desired in order to carry voice call packets. The routers and switches utilized in voice call paths must be able to identify voice packets and queue them ahead of packets that have less stringent requirements, thus reducing both jitter and delay. The network also should be reliable, so that packets are infrequently lost or damaged.

Identifying bad VoIP calls is conventionally performed by either of two ways: a) Synthetic testing that creates simulated voice calls, or b) Collecting and sorting delay, jitter, and dropped packet statistics from VoIP telephones. Once a bad call path has been identified, the faulty or misconfigured router, switch or network interface must be identified and corrected, or otherwise call problems will persist on the network.

VoIP analysis is a new market, and not many tools exist to aid a network administrator. The current set of tools are primarily focused on end-to-end analysis of active tests or of Call Data Records (CDRs) reported by telephone systems, or both. These two methods rely on detecting the presence of delay, jitter, or dropped packets, either from test data reported by probes or from CDRs after the actual calls are complete.

A probe is a small device that is a combination of hardware and software, or it can correspond to a completely software component that is loaded onto an existing computer or PC connected to a network. Probes often are controlled by a central test controller that is a dedicated computer that coordinates the tests between probes and collects and reports the results of the tests.

CDR data can be processed to identify those calls that have the worst call characteristics (e.g., high delay, high jitter, or high numbers of dropped packets). Unfortunately, that data, while useful for identifying that a problem exists, is not very useful for troubleshooting the problem and for identifying the cause of the problem.

Active test data, reported by probes that generate simulated calls, can provide more detail about problems it encounters because it can adapt to the presence of bad call characteristics and do additional testing on a link-by-link basis. Active testing relies on one or more sending and receiving systems to generate synthetic (artificial) voice calls to measure network characteristics that contribute to poor call quality. Typical characteristics are delay, jitter and dropped packets. Active testing can be used prior to implementing a VoIP system as a way to validate that the network is capable of handling voice calls with acceptable performance. It can also be configured to perform testing at regular, periodic intervals so as to detect problems that may occur at specific times of the day.

Cisco Systems' Service Assurance Agent™ is a conventional active testing mechanism. In addition to basic network performance data of a simulated call, it provides data on the routers that were traversed in the path between two test nodes. The data is similar to that provided by a Traceroute program. Once the routers in the path are identified by the active testing system, any switches that interconnect the routers can also be identified and the layer-2 connectivity between routers (which are layer-3 devices).

For active testing systems, the router hop-by-hop testing is limited to using Internet Control Message Protocol (ICMP) Echo Request and Echo Reply packets to measure network timing and throughput, whereby this level of testing is typically insufficient for identifying many of the problems that affect VoIP networks.

Thus, there is a need for a diagnostic tool to be utilized for VoIP networks.

SUMMARY OF THE INVENTION

An aspect of the present invention relates to a path diagnosis method and system for a VoIP network that includes obtaining information on VoIP calls from the VoIP network using either Call Data Records (CDRs) or active testing, or both. A VoIP call that has a problem is determined between a source and a destination device on the VoIP network, based on the obtained information. Likely call paths between the source and destination devices on the VoIP network are determined. The VoIP network is queried to obtain network data with respect to all devices that exist between the source and destination devices along the likely call paths. A path diagnostics chart is displayed that shows the devices that exist between the source and destination devices along the likely call paths, along with any call issues that exist for each of the devices.

Another aspect of the present invention relates to a program product for determining VoIP call problems on a VoIP network, the program product comprising machine-readable code for causing, when executed, one or more machines to perform a step of obtaining information on VoIP calls from the VoIP network using either Call Data Records (CDRs) or active testing, or both. A VoIP call that has a problem is determined between a source and a destination device on the VoIP network, based on the obtained information. Likely call paths between the source and destination devices on the VoIP network are determined. The VoIP network is queried to obtain network data with respect to all devices that exist between the source and destination devices along the likely call paths. A path diagnostics chart is displayed that shows the devices that exist between the source and destination devices along the likely call paths, along with any call issues that exist for each of the devices.

A further aspect of the invention relates to a path diagnosis system for use on a VoIP network, which includes means for obtaining information on VoIP calls from the VoIP network using either Call Data Records (CDRs) or active testing, or both. The system also includes means for determining that a VoIP call between a source and a destination device on the VoIP network has a problem, based on the obtained information. The system further includes means for determining likely call paths between the source and destination devices on the VoIP network. The system still further includes means for querying the VoIP network to obtain network data with respect to all devices that exist between the source and destination devices along the likely call paths. The system also includes means for displaying a path diagnostics chart that shows the devices that exist between the source and destination devices along the likely call paths, along with any call issues that exist for each of the devices.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 shows a path diagnostics chart that is created according to an embodiment of the invention.

FIG. 2 shows a path diagnostics chart settings form according to an embodiment of the invention.

FIG. 3 shows a path diagnostics chart status page according to an embodiment of the invention.

FIG. 4 shows a status excerpt obtained from the path diagnostics chart status page of FIG. 3.

FIG. 5 shows an analysis excerpt obtained from the path diagnostics chart status page of FIG. 3.

FIG. 6 shows a Layer 3 path diagnostics chart according to an embodiment of the invention.

DETAILED DESCRIPTION

Figure 7:
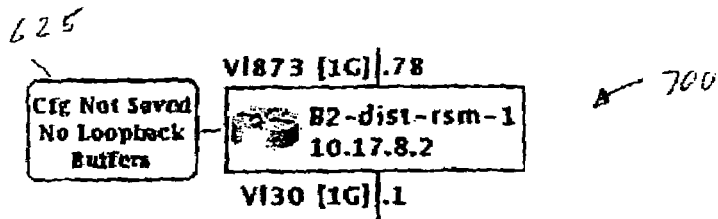
FIG. 7 shows a device information excerpt obtained from the Layer 3 path diagnostics chart of FIG. 6.

Reference will now be made in detail to embodiments of the invention, examples of which are illustrated in the accompanying drawings. An effort has been made to use the same reference numbers throughout the drawings to refer to the same or like parts.

The present invention utilizes several different types of VoIP analysis tools in combination, in order to perform VoIP analysis. As a result, call paths that exhibit poor voice quality and the network components that cause the poor calls can readily be identified, in order to correct any problems that may exist on a VoIP network.

The first embodiment utilizes Active testing, whereby routers are queried in order to obtain routing table information from the routers, so as to determine a particular call path that may be utilized between a sending telephone and a receiving telephone. By using routing table data, a spanning tree configuration can be obtained, so as to determine layer-2 connectivity used in a VoIP network. For example, information from the routing tables can be used to determine a next hop in a path between a source and a destination, and to determine Virtual LAN connections between routers.

The information obtained from the active tests is sorted to identify the paths that exhibit the worst characteristics. The worst characteristics can be individually identified (e.g., the worst jitter), or can be combined in various ways (e.g., the worst jitter combined with the longest delay or other combinations of the characteristics). The worst call paths are then reported, such as to a data administrator by way of a display device (e.g., PC monitor). Any call paths whose characteristics are worse than acceptable standards, as defined by experts in the field for example, are reported as exceptionally bad and the paths are then examined for problems, so that the problems can be corrected.

In addition to the use of active testing, the first embodiment utilizes CDRs in order to find and correct problems on a VoIP network. On a busy network, it may not be acceptable to run a large set of active tests, particularly if VoIP is in use on the network. In this case, it is better to combine active testing with analysis of CDRs. CDRs can, depending on the vendor, report call characteristics such as call errors, delay, jitter, and dropped packets. The first embodiment gathers CDRs at periodic intervals, and sorts them to identify the worst calls, based on the call characteristics. The IP addresses identified in the CDRs may then be used to initiate active tests, in order to identify the problem so that the problem can be corrected.

Active testing between IP addresses between which poor calls have been reported will generate additional data, such as whether the poor performance occurs periodically, continuously or intermittently. Based on the router table information obtained, the path that the calls were likely to take is determined. In one case, if the poor calls were due to a temporary problem that no longer exists when the active tests are initiated, that problem will not show up in the active test results, and the problem will be identified as an intermittent problem. Once the likely path has been identified, further data collection and analysis can be performed, according to the first embodiment.

With call path information of poor calls, as obtained from the CDR data and/or the active testing data, further analysis is performed to validate the quality of service (QoS) operation and configuration on devices and interfaces along a path between a source and destination telephone. A variety of mechanisms can be used to access such operation and configuration data. One mechanism is the Simple Network Management Protocol (SNMP) Management Information Base (MIB). Another mechanism is the use of scripts that gather data using a normal user interface access method, such as telnet or secure shell (SSH). Yet another mechanism is capturing and analyzing configuration files. The QoS configuration is preferably checked on all devices in the designated path, to make sure that a compatible queuing mechanism is used between adjacent devices along the network path. An incompatible queuing mechanism may result in dropped packets or in long queuing delays as other data flows traverse the same device or interfaces on those devices.

In the first embodiment, the QoS operation is checked for congestion within each of the different levels of service configured on the devices on the path between a source and a destination device. Queue drops at the highest queue generate exception messages as they result in dropped packets. Overall device and interface utilization are also checked and correlated with queue processing data to identify interfaces that are overutilized. These overutilized interfaces are designated for upgrading with additional bandwidth, so that they can handle the load that is presented without dropping packets or starving low level queues.

The call path information of poor calls is used in the first embodiment to identify all network issues that have been identified on all devices and interfaces in the call path of the poor calls. This will be explained in more detail with respect to a path diagnostics tool utilized in the first embodiment.

The first embodiment generates a path diagnostics chart by retrieving various data from a network database, including routing tables, ARP tables, and switch forwarding tables, which have been collected over a period of time. The retrieving of this information is preferably performed at periodic intervals, such as every 10 minutes. The routers and switches in the network are periodically queried to provide their relevant network data, and that data is collected in order to create the path diagnostics chart. The generation process does not require direct connection to the network, unlike the active testing that is performed by conventional VoIP analysis tools. That way, information can be collected "off-network" by consultants analyzing data from networks that they can no longer access. Also, missing and/or inconsistent data is dealt with in the creation of a path diagnostics chart, using data from neighboring devices as needed to overcome such data deficiencies.

FIG. 1 shows a path diagnostics chart 100 between a source device (telephone) 110 and a destination device (VoIP gateway) 120, that is created in accordance with the first embodiment. The path diagnostics chart 100 is preferably provided on a computer monitor of a network administrator, to be used by the network administrator to determine network problems on a VoIP network and to resolve those problems expeditiously. The path diagnostics chart 100 displays all possible paths between two given network addresses over a given period of time of any length. This allows an analyst to determine how variations in the routing process over time may have caused the problem or problems being investigated. Thus, assuming that the periodically received CDR data determines a potential problem in a call between source and destination telephones on a network, and whereby additional active testing performed between those two IP addresses does not identify the problem, the path diagnostics chart 100 is created based on the network database information obtained by querying network devices on the network, so that the network administrator can determine the problem devices that are causing the poor calls on the network.

The path diagnostics chart 100 is capable of showing "Layer 3 Only" paths that include only the routers located along the path, or "Layer 2 and 3" paths that include all routers and all intermediate switches between those routers. The Layer 2 and 3 path can be used to quickly determine all of the managed devices traversed by a path, as well as all of the interfaces and switch ports used. This can significantly reduce the time needed to troubleshoot a wide range of network problems. FIG. 1 shows a Layer 2 and 3 path, with switch swA4 provided between source telephone 110 and router vpn1, router rtr2 provided between router vpn 1 and router ts 1, a VPN path provided between router vpn1 and router ts 1, and a switch sw134 provided between router ts 1 and destination device 120, whereby destination device 120 is a gateway.

In addition to showing the connections between devices along the path and identification information for all devices, interfaces, switch ports and VLANs, the path diagnostics chart 100 can be configured to display the results of all analysis activities performed for such components over a selected time period (e.g., over a particular one hour time interval). The analysis results (or "issues") show all of the possible problems associated with each of the path components, allowing a network engineer or network administrator to focus on the most likely cause of the problem being investigated. In FIG. 1, a "Route Loop—No Routes Buffers" issue 130 is identified at router rtr2, a "Configuration Differences" issue 140 is identified at router ts 1, "No Loopback Buffers and Configuration Differences" issues 150 are identified at router vpn1, a "Top Changes" issue 160 is identified at switch sw134, and a "Call Errors" issue 170 is identified at source device (telephone) 110. Furthermore, packet discards 180, 185 are identified on the path diagnostics chart 100 between router vpn1 and rtr2.

The information displayed on the path diagnostics chart 100 is capable of being shown as hyperlinks, allowing users to drill down to more detailed information displays associated with one or more of the chart components. In this way, the path diagnostics chart 100 can be used as a navigable index of a much larger collection of data that was used to construct the path diagnostics chart 100, as well as associated data that was used in the generation of the path diagnostics chart 100.

Now, a detailed explanation of a path diagnostics chart that can be utilized by a network administrator on his/her PC will be explained below, with reference to FIGS. 2-9. A path diagnostics tool is a software application executable on a user's PC, whereby such a tool is available from a Tools page menu on the user's PC. When enabled, the path diagnostics tool is able available as a drill down from all appropriate VoIP issues, VoIP call results, and VoIP test results, in which case the source, destination, and time period are automatically entered for the user.

FIG. 2 shows a pop-up display 200 that a user sees when the path diagnostics tool is executed. A user enters IP addresses for the source and target (destination) devices at locations 210 and 220, respectively, whereby the source and target devices may be either network or non-network devices. As a convenience to the user, a list of all network devices known by the path diagnostics tool is provided to the user as a separate pop-up display 250, allowing the user to select the desired device by IP address or by name. When a selection is made, the corresponding entry field is filled out automatically and the address type is automatically toggled. This allows operators to make two successive choices to fill out the first two fields 210, 220 of the entry form.

The gateway field 230 can be used to enter a value as a "hint" to the path diagnostics tool, if it cannot automatically determine a first hop taken from a source IP address. This is most commonly needed when a PC or workstation IP address is specified as the source address and no default gateway can be determined. The user is allowed to leave the gateway field 230 defaulted to 0.0.0.0 initially, whereby if no first hop can be determined, one can then add the required information and regenerate the path diagnostics chart.

Also shown in FIG. 2 is a display area 260 where the user selects either "Layer 3 Only" or "Layer 2 and 3", to determine the level of detail to be provided on the path diagnostics chart that is to be created. Further, FIG. 2 shows a display area 270 where the user enters a time period (01-05-2005) to be used to show all possible routes that exist during that time period. The time period is also selected in the display area 260. Once all of that information has been entered, the user selects "OK" 280 to save and enter that information, whereby a path diagnostics chart is now created based on the user selections.

As explained above, based on CDR data and/or active test data periodically obtained by the path diagnostics system, the user can determine to check out a particular path or paths that need to be analyzed in greater detail, in order to diagnose and correct poor VoIP calls and paths associated with those poor VoIP calls.

While the path diagnostics chart is being created based on the user selections as provided in FIG. 2, and based on the network database information periodically obtained by the path diagnostics system from the VoIP network, the user is presented with a Path Diagnosis status page 300, as shown in FIG. 3. The Path Diagnosis status page 300 provides a textual representation of the network components being determined to exist between a designated source address and a designated target address. The Path Diagnosis status page 300 is automatically updated as the path diagnostics chart is being created, allowing operators to monitor its progress. A Cancel button 310 can be used to halt the process at any time, and a Settings button 320 can be used to return to the Settings form (see FIG. 2) to change parameters and restart the process. The operator can also change the Timestamp and/or Time Period directly from the Path Diagnosis status page 300, by entering information in the Time Change region 330, which will automatically restart the diagnostics process.

The status page serves as both a textual output of the diagnostic process and as a log of the various decisions made through the process. Since the diagnostic process is preferably based on an internal collection of heuristics and the network database may not always contain all of the desired information, the status information is very useful when determining why a certain path was chosen by the path diagnostics tool.

For example, the status excerpt 400 provided in FIG. 4, which is a portion of the status information shown in FIG. 3, shows how the path diagnostics tool determines the hop to be taken from one device to another device along the path. In this case, the path diagnostics tool found a matching route in the tr-c-rsm-2 route table that provided the necessary next hop information. In certain instances, it may not be possible for the path diagnostics tool to determine the next hop from the information contained in the network database for a given time period because of missing, obsolete or inconsistent data. If the next hop cannot be determined, then an appropriate message is displayed on the display (e.g., NEXT HOP CANNOT BE DETERMINED, TRY AGAIN).

After all of the paths between given source and target addresses have been determined, the path diagnostics tool determines all of the issues associated with the devices and interfaces found. The results of this analysis process is displayed at the bottom of the status page, as provided in FIG. 5, which shows the generated issues in textual form 500, whereby that corresponds to a portion of the status information shown in FIG. 3.

When the path diagnostics process has completed, a popup window is displayed, containing the path diagnostics chart. The path diagnostic chart is a graphical representation of the results determined by the path diagnostics tool. By default, the path diagnostics chart shows all routers and/or switch-routers along the path from the given source and target IP addresses, which is called a 'Layer 3 Only' chart. Such a Layer 3 Only chart is shown as a Path Diagnostics Chart 600 in FIG. 6. In FIG. 6, three routers 610, 620, 630 are included in the Path Diagnostics Chart 600, whereby a source IP address corresponds to the first router 610, and a target IP address corresponds to a router-switch 630. The Path Diagnostics Chart 600 also includes the issues determined for each of those routers 610, 620, 630, whereby the issues are provided as text regions 615, 625, 635 adjacent to each of the routers 610, 620, 630.

Any pair of addresses can be defined as the source and target IP addresses. If those addresses are associated with a given device in the network database, then the path diagnostics tool displays the names of the device (or "unknown") and the management address for that device. Additionally, an appropriate icon is displayed based on the device type, on the path diagnostics chart. If the device type cannot be determined or no icon exists for the device type, then "???" is displayed for the icon.

Furthermore, each device shown on the path diagnostics chart is preferably color-coded, for ease in reviewing the path diagnostics chart by an operator. For example, "green" indicates that no 'device' issues were associated with that device during the given time period, while "red" indicates that at least one issue existed for that device during the given time period. If the device is colored red, then the list of issues associated with that device are preferably shown in a yellow callout adjacent to the device. As seen in FIG. 7, which shows a portion 700 of the path diagnostics chart of FIG. 6, the callout 625 shows abbreviations for the issues, in order to save display space.

The device and callout areas on the path diagnostics chart are implemented as hyperlinks that can be used to display additional information for that device. This allows users to browse any of the information associated with that device, without cluttering up the path diagnostics chart. By simply moving a computer mouse over either region and by pressing a mouse button (e.g., left click), the particular hyperlink is activated, and the user then sees additional information provided for that particular issue and/or device. Also, interface issues associated with a given device are not displayed for that device itself, but rather they are displayed for the specific interface associated with that issue.

Figure 8:
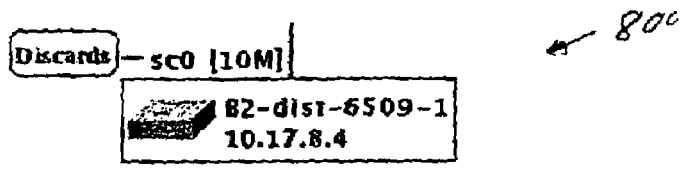
FIG. 8 shows an interface information excerpt obtained from the Layer 3 path diagnostics chart of FIG. 6.

Referring now to FIG. 8, which shows a portion 800 of the path diagnostics chart of FIG. 6, for every hop along the path from source to target device, the path diagnostics chart shows the interfaces associated with both ends of the link. Such interfaces are determined from information contained in the network database, which may be incomplete for various reasons. If known, the interface name and speed are displayed to identify the interface. Additionally, if the interface has been assigned an IP address, the host number assigned to that interface is displayed based on the subnet mask assigned to that interface (e.g., last octet for /24 or higher, last two octets for /16 or higher, etc.).

If issues were associated with an interface during the given time period, a callout will be displayed next to that interface indicating each of the issues. Only interface-specific issues are listed in the interface callout.

The interface information and issue callouts can be implemented as hyperlinks that can be used to display detailed data about that interface. Specifically, interface performance charts for that interface are displayed on a pop-up display when the hyperlink is selected.

For each hop along the Layer 3 path, the associated subnet address and mask are displayed in a particular color, such as blue. In one possible implementation, no hyperlink is implemented for the subnet information in the Layer 3 path diagnostics chart.

Figure 9:
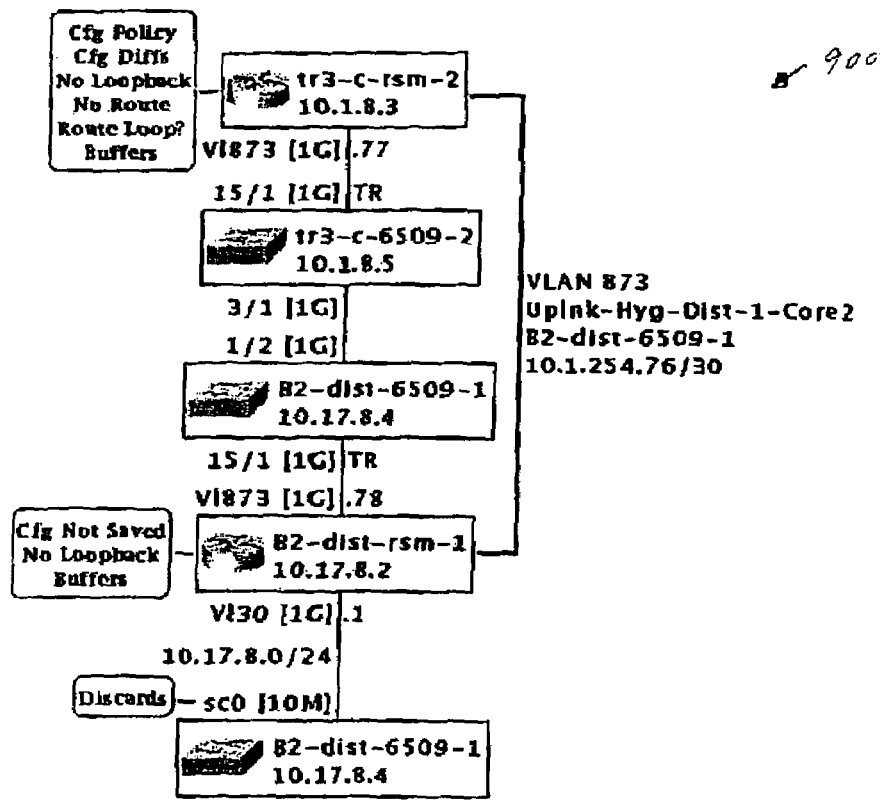
FIG. 9 shows a Layer 2 and 3 path diagnostics chart according to an embodiment of the invention.

FIG. 9 shows a Layer 2 and Layer 3 Path Diagnostics Chart 900, in accordance with the first embodiment of the invention. If the Display Depth choice on the Settings form is set to "Layer 2 and 3", then the Path Diagnostics Chart that is subsequently generated will include all of the intermediate switches, if any, between each set of routers along the path from source to target. For example, the Layer 2 and 3 version of the previous path shown in FIG. 6 would look like the Path Diagnostics Chart 900 shown in FIG. 9.

In this case, the first hop traversed two intermediate switches, tr3-c-6509-c and B2-dist-6509-1. For each switch shown in FIG. 9, the inbound and outbound interfaces are displayed, including the interface name, speed and trunking status. If the interface is currently trunking, the abbreviation "TR" is provided adjacent to that interface. In FIG. 9, the link between the switches tr3-c-6509-c and B2-dist-6509-1 is not currently trunking.

The switches can be displayed in different colors depending if issues have or have not been identified for them during the specific time period ("green" means no issues, "red" means at least one issue has been identified).

In addition to displaying the switches along the path, the Layer 2 and 3 Path Diagnostics Chart 900 also can graphically depict all VLANs traversed along the path. FIG. 9 shows VLAN 873 provided between router tr3-c-rsm-2 and router B2-dist-rsm-1. The VLAN information includes the ID, name, root bridge and subnet information, if available. If any of this information cannot be determined from the network database, then "???" is displayed for that piece of information. The VLAN information can be implemented as a hyperlink, allowing the user to drill down for more detailed information on the VLAN. When selected, a pop-up display appears, providing more detailed information that is known about the VLAN.

A Print hyperlink 910 is provided on the upper left-hand corner of the Path Diagnostics Chart 900, as a convenient way to print the chart, using standard browser capabilities.

The network database information used by the Path Diagnostic tool can be obtained using any number of standard network data collection techniques, including, but not limited to, data polling using the SNMP Protocol and configuration file gathering using the Telnet and/or SSH protocols. Typically, such data is gathered on a periodic basis (e.g., every 10 minutes or once per hour) at a rate consistent with the volatility of the data. The specific way in which network data is collected is irrelevant to the Path Diagnostic process, which relies solely on the information stored in the network database itself.

Figure 10:
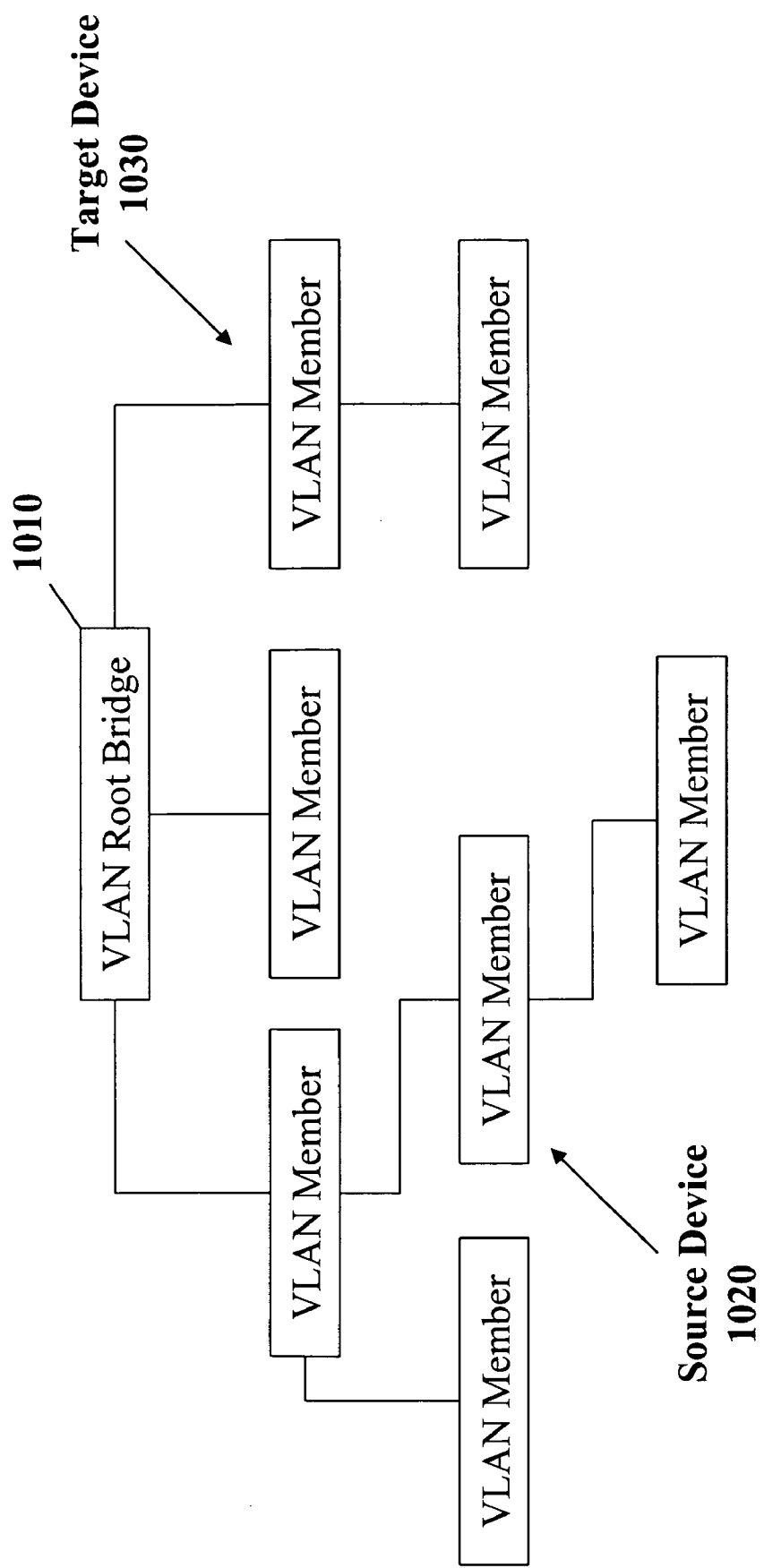
FIG. 10 shows a VLAN example tree representation according to an embodiment of the invention.
Figure 11:
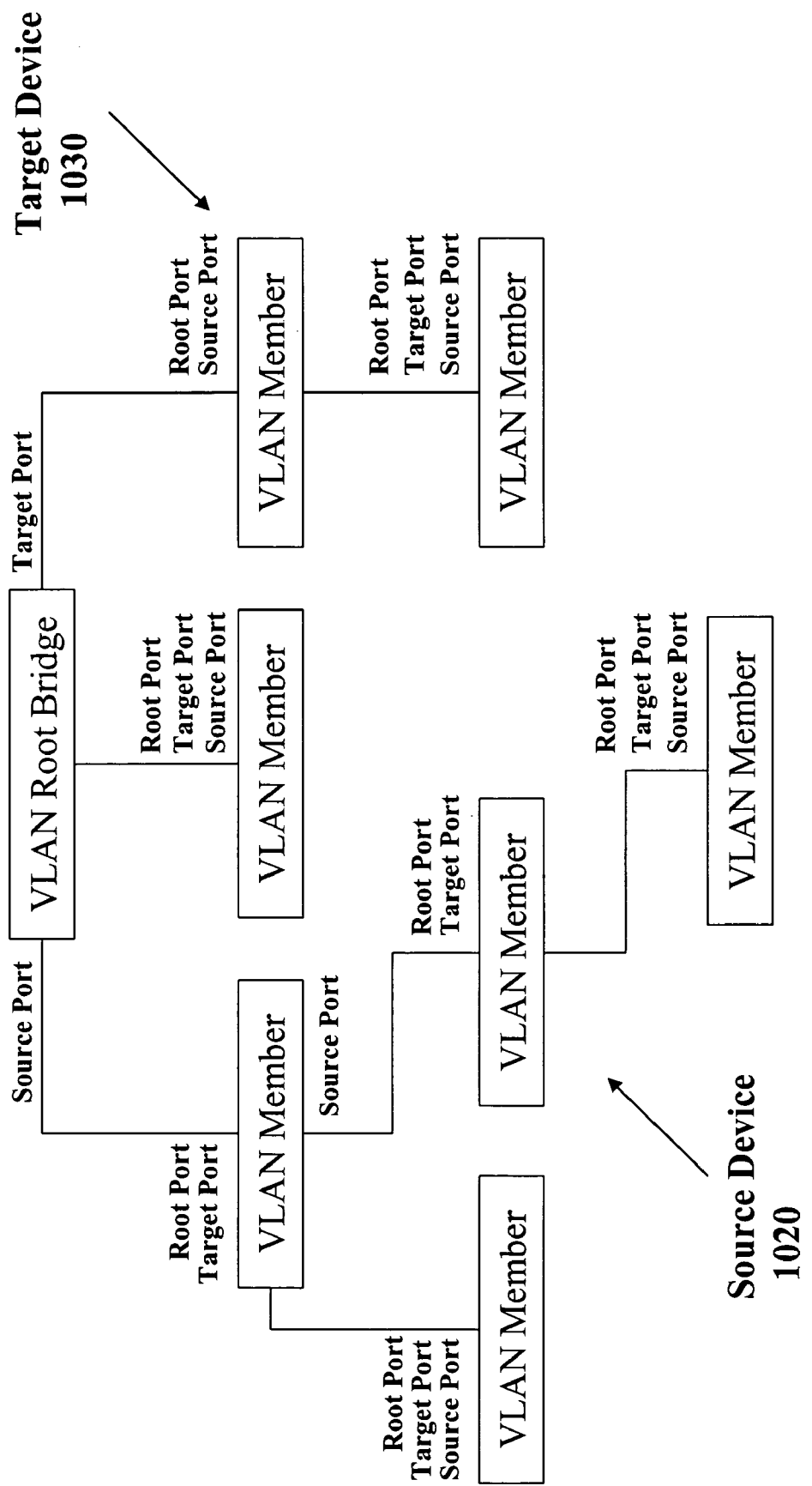
FIG. 11 shows VLAN key ports designations according to an embodiment of the invention.
Figure 12:
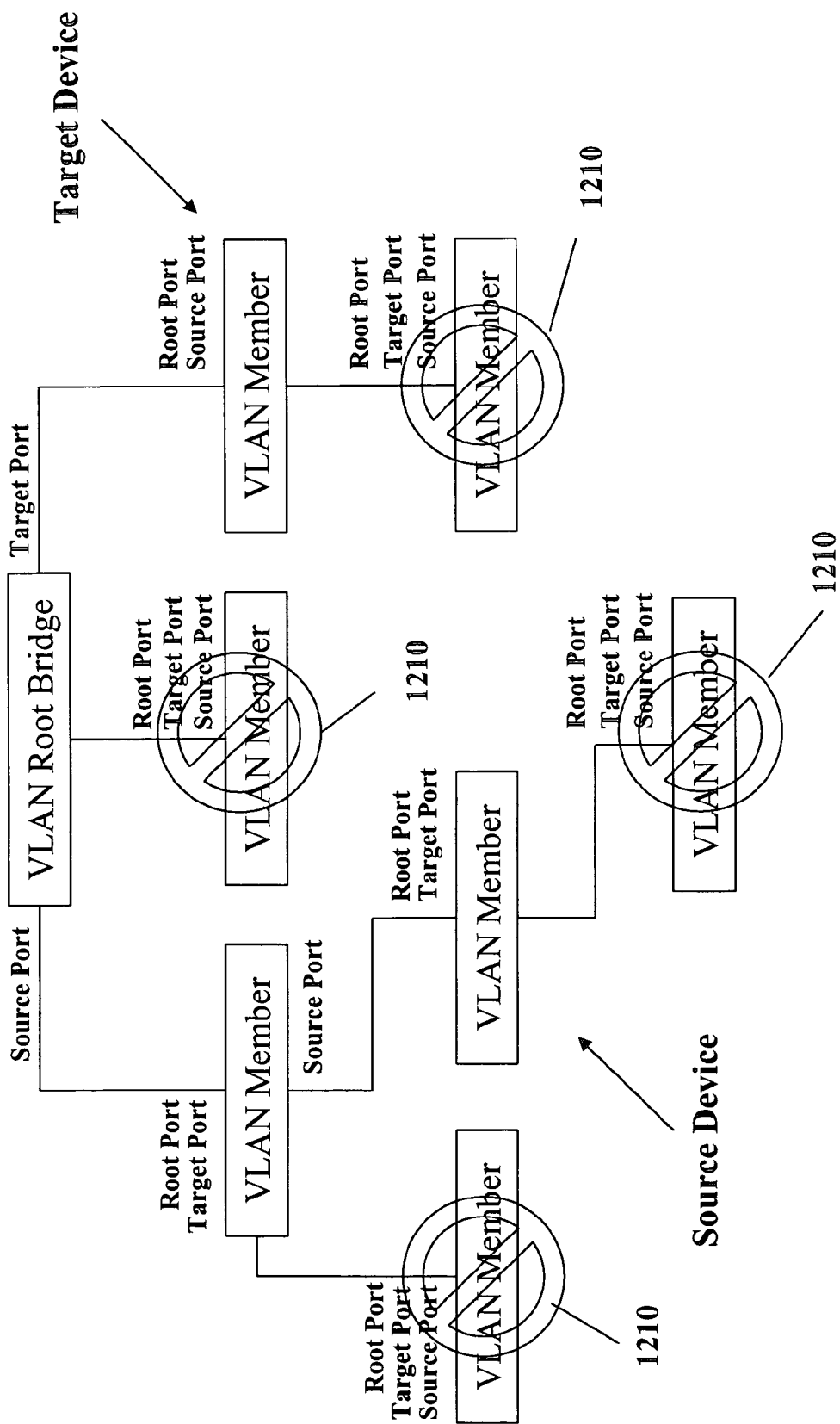
FIG. 12 shows a VLAN diagram showing members outside the path, according to an embodiment of the invention.

The Path Diagnostic process uses the following heuristic to determine all of the routes possible during the given time period. The process proceeds by "hopping" from one device to another until the destination is reached. Each hop decision is based on the following steps:

1) If the target device was previously reached from the source device, then the information stored in the "hop cache" will be used.
2) If the source and target devices are in the same subnet, then the target itself is used as the next hop
3) If a route table is found for the source device and at least one route entry is found that matches the target device, then the hop(s) defined is(are) used
4) If a configuration file is stored for the source device and a default gateway is defined, then the default gateway will be used as the next hop
5) If there is at least one HSRP router interface in the same subnet as the source device, then the router associated with the lowest HSRP IP address in the subnet is used as the next hop
6) If there is at least one router interface in the same subnet as the source device, then the router associated with the lowest IP address in the subnet is used as the next hop
7) If the user provided a default gateway IP address and it is in the same subnet as the source device, then the user-provided default gateway is used as the next hop A Layer 2 and 3 Path Diagnostic chart attempts to show all of the intermediate switches for each "hop" along the path. That is, for each pair of source and target devices along the path an attempt is made to determine if there are one or more switches between those devices over which any packets transmitted between those devices will traverse. Since it is not always possible to determine such switches (due to insufficient or inaccurate network data) the following heuristic is used:

1) If the source and target devices are "neighbors", as indicated by the CDP or equivalent data collected for either the source or target devices (or both), then no intermediate switches are displayed
2) The physical address (e.g., MAC) is determined for the source interface corresponding to the route entry previously determined for the hop. If no physical address can be determined, then an error message is displayed indicating such.
3) The physical address (e.g., MAC) is determined for the target interface corresponding to the route entry previously determined for the hop. If no physical address can be determined, then an error message is displayed indicating such.
4) If a VLAN is associated with the source device, then it is used for subsequent processing. Otherwise, if a VLAN is associated with the target device, then it is used for subsequent processing. Otherwise, the physical address associated with the source interface is used to search through all VLAN members entries to locate a corresponding VLAN. If no VLAN can be determined, then an error message is displayed indicating such.
5) A VLAN can be represented as a "tree" of switches, with a "root bridge" switch at the top, one or more "member" switches below the root bridge, one or more member switches below each of those member switches, etc. (See FIG. 10, which shows an example tree representation having a VLAN root bridge 1010 and a plurality of VLAN members including a source device 1020 and a target device 1030). Steps 1-4 determine the VLAN that contains both the source and target devices as VLAN members.
6) For each VLAN member, the "source port" (the port facing the source device), the "target port" (the port facing the target device) and the "root port" (the port facing the root bridge) are determined. (See FIG. 11, which shows the key port designations for a first VLAN member that corresponds to the source device 1020, and a second VLAN member that corresponds to the target device 1030).
7) All VLAN members that have identical source and target ports are known to be outside of the path between the source and target devices, so they are ignored for subsequent processing. (See FIG. 12, whereby the ignored VLAN members are shown with an 'ignore symbol' 1210 provided thereon. In FIG. 12, VLAN members with identical source and target ports are not along path and can be ignored).
8) Of the remaining VLAN members, the member with the lowest root cost is deemed the "lowest common ancestor" of the source and target devices. (See FIG. 13, whereby the lowest common ancestor is the VLAN root bridge 1010 has a root cost equal to zero).
9) All VLAN members, if any, with identical target and root ports are on the "uphill" path 1310 (as seen in FIG. 13) from the source device to the lowest common ancestor.

Figure 13:
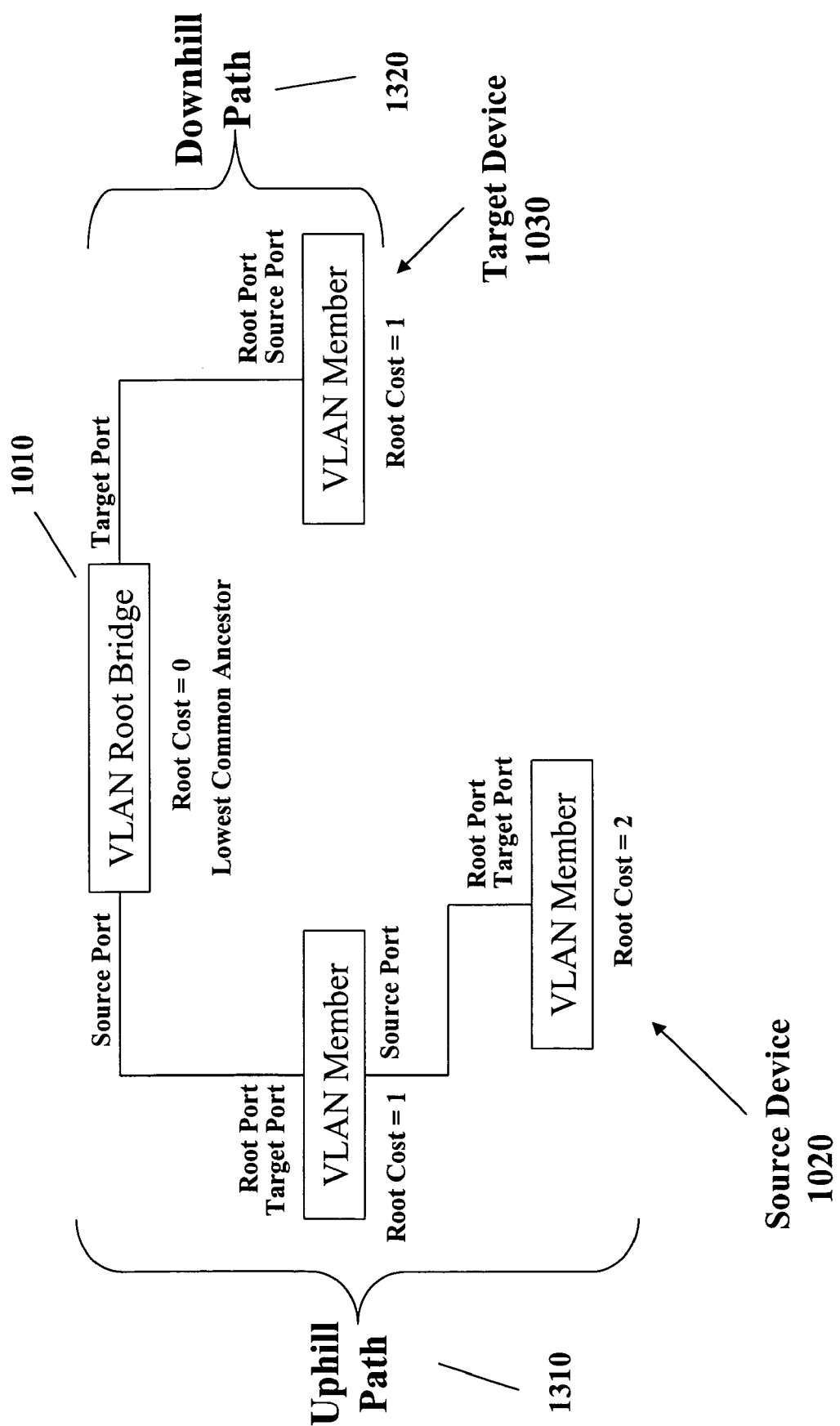
FIG. 13 shows a VLAN lowest common ancestor determination according to an embodiment of the invention.

10) All VLAN members, if any, with identical source and root ports are on the "downhill" path 1320 (as seen in FIG. 13) from the lowest common ancestor to the target device.

11) In the current implementation, Steps 6-10 are performed solely with database commands (e.g., SQL commands), thereby eliminating all custom programming and decreasing the overall processing time of the computation. With one set of SQL commands, an ordered list of intermediate VLAN member switches between the source and target devices is determined.

12) After all intermediate VLAN members have been determined, the physical interfaces used by the source and target devices to connect to the VLAN can be accurately determined, overwriting any virtual interfaces that were initially used to determine the VLAN. Such physical interface information is more valuable for troubleshooting purposes, but may not otherwise be determined until after the intermediate VLAN members have been determined.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. The scope and spirit of the invention are indicated by the following claims.

What is claimed is:

1. A path diagnosis method for a VoIP network, comprising:
   obtaining information on VoIP calls that are ongoing or that have been completed from the VoIP network using one or more data sources including Call Data Records (CDRs) or active testing, or both;
   determining that a VoIP call between a source and a destination device on the VoIP network has a problem, based on the obtained information;
   determining likely call paths between the source and destination devices on the VoIP network, the determining of likely call paths being made based on at least routing table information;
   querying the VoIP network to obtain network data with respect to all devices that exist between the source and destination devices along the likely call paths;
   displaying a path diagnostics chart that shows network connectivities between the devices that exist between the source and destination devices along the likely call paths, displaying at least one of: interfaces, links, link speeds, addresses, subnets and VLANs on the path diagnostics chart, analyzing the collected data to detect current and potential issues, and displaying a list of call issues or current and potential network problems that exist for each of the devices on the path diagnostics chart; and
   receiving information entered by a user with respect to an IP address of the source device and an IP address of the destination device, as well as information entered by the user as to whether a layer 3 path diagnostic chart or a layer 2 and 3 path diagnostic chart is to be displayed,
   wherein the likely call paths correspond to all possible routes that exist between the source device and the destination device, and
   wherein, when the layer 2 and 3 path diagnostic chart is to be displayed, intermediate switches that exist between routers along a path between the source and destination devices are also displayed, wherein the routers and not the intermediate switches are displayed when the layer 3 path diagnostic chart is to be displayed.

2. The path diagnostics method according to claim 1, further comprising:
   prior to the displaying step, entering in information by a user with respect to a time period for which the call issues are to be determined for each of the devices that exist between the source and destination devices along the likely call paths.

3. The path diagnostics method according to claim 1, further comprising:
   providing hyperlinks for each of the network elements displayed on the path diagnostic chart, for enabling the user to drill down to obtain further information on the respective devices.

4. The path diagnostics method according to claim 2, further comprising:
   prior to the displaying step, determining an IP address of a gateway used in a first hop from the source device to another device in the VoIP network in a direction towards the destination device.

5. The path diagnostics method according to claim 4, wherein the IP address of the gateway is determined automatically when a user does not enter in an IP address on a user interface for the gateway.

6. The path diagnostics method according to claim 4, wherein the IP address of the gateway is determined based on a user entry of a gateway IP address on a graphical user interface.

7. The path diagnostics method according to claim 1, wherein the call issues include: packet discards, device configuration differences, and lack of packet buffers, and wherein the call issues are individually provided on the path diagnostic chart adjacent to each of the devices along the likely call paths between the source and destination devices.

8. The path diagnostics method according to claim 7, wherein the call issues further include: packet jitter above a predetermined value, packet delay above a predetermined value, and lost packets above a predetermined percentage between the source and destination devices.

9. The path diagnostics method according to claim 1, wherein the step of determining that a VoIP call between a source and a destination device on the VoIP network has a problem comprises:
   performing additional analysis of QoS operation and configuration for the devices existing between the source and destination devices on the VoIP network.

10. A computer readable medium embodying a program product for determining VoIP call problems on a VoIP network, the program product comprising machine-readable code for causing, when executed, one or more machines to perform the steps of:
    obtaining information on VoIP calls that are ongoing or that have been completed from the VoIP network using one or more data sources including Call Data Records (CDRs) or active testing, or both;
    determining that a VoIP call between a source and a destination device on the VoIP network has a problem, based on the obtained information;
    determining likely call paths between the source and destination devices on the VoIP network, the determining of likely call paths being made based on at least routing table information;
    querying the VoIP network to obtain network data with respect to all devices that exist between the source and destination devices along the likely call paths;

displaying a path diagnostics chart that shows network connectivities between the devices that exist between the source and destination devices along the likely call paths, displaying at least one of: interfaces, links, link speeds, addresses, subnets and VLANs on the path diagnostics chart, analyzing the collecting data to detect current and potential issues, and displaying a list of call issues or current and potential network problems that exist for each of the devices on the path diagnostics chart; and means for receiving information entered by a user with respect to an IP address of the source device and an IP address of the destination device, as well as information entered by the user as to whether a layer 3 path diagnostic chart or a layer 2 and 3 path diagnostic chart is to be displayed, wherein the likely call paths correspond to all possible routes that exist between the source device and the destination device, and wherein, when the layer 2 and 3 path diagnostic chart is to be displayed, intermediate switches that exist between routers along a path between the source and destination devices are also displayed, wherein the routers and not the intermediate switches are displayed when the layer 3 path diagnostic chart is to be displayed.

11. The computer readable medium according to claim 10, further comprising:

prior to the displaying step, entering in information by a user with respect to a time period for which the call issues are to be determined for each of the devices that exist between the source and destination devices along the likely call paths.

12. The computer readable medium according to claim 10, further comprising:

providing hyperlinks for each of the devices displayed on the path diagnostic chart, for enabling the user to drill down to obtain further information on the respective devices.

13. The computer readable medium according to claim 11, further comprising:

prior to the displaying step, determining an IP address of a gateway used in a first hop from the source device to another device in the VoIP network in a direction towards the destination device.

14. The computer readable medium according to claim 13, wherein the IP address of the gateway is determined automatically when a user does not enter in an IP address on a user interface for the gateway.

15. The computer readable medium according to claim 13, wherein the IP address of the gateway is determined based on a user entry of a gateway IP address on a graphical user interface.

16. The computer readable medium according to claim 10, wherein the call issues include: packet discards and device configuration differences, and wherein the call issues are individually provided on the path diagnostic chart adjacent to each device along the likely call paths between the source and destination devices.

17. The computer readable medium according to claim 16, wherein the call issues further include: packet jitter above a predetermined value, packet delay above a predetermined value, and lost packets above a predetermined percentage between the source and destination devices.

18. The computer readable medium according to claim 10, wherein the step of determining that a VoIP call between a source and a destination device on the VoIP network has a problem comprises:

performing additional analysis of QoS operation and configuration for the devices existing between the source and destination devices on the VoIP network.

19. A path diagnosis system for use on a VoIP network, comprising:

means for obtaining information on VoIP calls that are ongoing or that have been completed from the VoIP network using one or more data sources including Call Data Records (CDRs) or active testing, or both;

means for determining that a VoIP call between a source and a destination device on the VoIP network has a problem, based on the obtained information;

means for determining likely call paths between the source and destination devices on the VoIP network, the determining of likely call paths being made based on at least routing table information;

means for querying the VoIP network to obtain network data with respect to all devices that exist between the source and destination devices along the likely call paths; and means for displaying a path diagnostics chart that shows network connectivities between the devices that exist between the source and destination devices along the likely call paths, displaying at least one of: interfaces, links, link speeds, addresses, subnets and VLANs on the path diagnostics chart, analyzing the collected data to detect current and potential issues, and displaying a list of call issues or current and potential network problems that exist for each of the devices on the path diagnostics; and receiving information entered by a user with respect to an IP address of the source device and an IP address of the destination device, as well as information entered by the user as to whether a layer 3 path diagnostic chart or a layer 2 and 3 path diagnostic chart is to be displayed, wherein the likely call paths correspond to all possible routes that exist between the source device and the destination device, and wherein, when the layer 2 and 3 path diagnostic chart is to be displayed, intermediate switches that exist between routers along a path between the source and destination devices are also displayed, wherein the routers and not the intermediate switches are displayed when the layer 3 diagnostic chart is to be displayed.

20. The path diagnostics system according to claim 19, further comprising:

means for entering in information by a user with respect to a time period for which the call issues are to be determined for each of the devices that exist between the source and destination devices along the likely call paths.

21. The path diagnostics system according to claim 19, further comprising:

means for providing hyperlinks for each of the devices displayed on the path diagnostic chart, for enabling the user to drill down to obtain further information on the respective devices.

22. The path diagnostics system according to claim 20, further comprising:

means for determining an IP address of a gateway used in a first hop from the source device to another device in the VoIP network in a direction towards the destination device.

23. The path diagnostics system according to claim 22, wherein the IP address of the gateway is determined automatically when a user does not enter in an IP address on a user interface for the gateway.

24. The path diagnostics system according to claim 22, wherein the IP address of the gateway is determined based on a user entry of a gateway IP address on a graphical user interface.

25. The path diagnostics system according to claim 19, wherein the call issues include: packet discards and device configuration differences, and wherein the call issues are individually provided on the path diagnostic chart adjacent to each device along the likely call paths between the source and destination devices.

26. The path diagnostics system according to claim 25, wherein the call issues further include: packet jitter above a predetermined value, packet delay above a predetermined value, and lost packets above a predetermined percentage between the source and destination devices.

27. The path diagnostics system according to claim 19, wherein the step of determining that a VoIP call between a source and a destination device on the VoIP network has a problem comprises:

performing additional analysis of QoS operation and configuration for the devices existing between the source and destination devices on the VoIP network.

* * * * *